(12) United States Patent
Unger et al.

(10) Patent No.: US 9,388,921 B2
(45) Date of Patent: Jul. 12, 2016

(54) PLUG-IN PIECE

(71) Applicant: Carl Freudenberg KG, Weinheim (DE)

(72) Inventors: Hans Unger, Absteinach (DE); Ralf Heldmann, Wald-Michelbach (DE); Ingo Stephan, Rimbach (DE); Markus Clemens, Reichelsheim (DE); Carsten Hartmann, Hirschberg (DE); Ernst Jakob, Rimbach (DE); Stephan Reddig, Kaiserslautern (DE)

(73) Assignee: Carl Freudenberg KG, Weinheim (DE)

( * ) Notice: Subject to any disclaimer, the term of this patent is extended or adjusted under 35 U.S.C. 154(b) by 196 days.

(21) Appl. No.: 14/012,111

(22) Filed: Aug. 28, 2013

(65) Prior Publication Data

US 2014/0091533 A1  Apr. 3, 2014

(30) Foreign Application Priority Data

Sep. 28, 2012  (DE) .......................... 10 2012 019 106

(51) Int. Cl.
*F16L 17/025* (2006.01)
*F16L 25/14* (2006.01)
*F16L 21/02* (2006.01)
*F16L 37/02* (2006.01)

(52) U.S. Cl.
CPC ............ *F16L 17/025* (2013.01); *F16L 21/022* (2013.01); *F16L 25/14* (2013.01); *F16L 37/025* (2013.01)

(58) Field of Classification Search
CPC ........... F16J 15/022; F16J 5/10; F16J 17/025; F16J 21/02; F16J 27/108; F16J 47/08; F16J 49/02
See application file for complete search history.

(56) References Cited

U.S. PATENT DOCUMENTS

| | | | | | |
|---|---|---|---|---|---|
| 509,458 | A | * | 11/1893 | Still | 285/39 |
| 2,265,615 | A | * | 12/1941 | Stalter | 277/648 |
| 3,385,367 | A | * | 5/1968 | Kollsman | 166/191 |
| 4,621,841 | A | * | 11/1986 | Wakefield | 285/139.2 |
| 6,106,030 | A | * | 8/2000 | Nader et al. | 285/368 |
| 8,695,988 | B2 | | 4/2014 | Smith | |
| 2009/0072494 | A1 | * | 3/2009 | Smith | 277/625 |
| 2010/0207332 | A1 | | 8/2010 | Smith | |

FOREIGN PATENT DOCUMENTS

DE  19548249 A1  6/1997
EP  2325937 A1  5/2011

* cited by examiner

*Primary Examiner* — Vishal Patel
(74) *Attorney, Agent, or Firm* — Daniel J. Sepanik, Esq.; Harness, Dickey & Pierce, P.L.C.

(57) ABSTRACT

A plug-in piece 1 for sealing connection of two mutually assigned cylindrical surfaces includes an essentially tubular support body 2, which on its ends exhibits annularly encircling sealing elements, which can be made to engage to produce a sealing connection with the cylindrical surfaces to be sealed, wherein at least one of the sealing elements is configured as an annularly encircling sealing bead 3, 30 on the outer surface of the support body 2, with a spherically curved sealing surface. Provision is made that the spherical radius of the sealing surface (3, 30) is chosen so that the center of the sphere is roughly at the axis of support body (2) symmetry. Thus, the compression forces are ensured to remain largely constant, independent of the angular setting over the entire surface of the sealing bead.

8 Claims, 6 Drawing Sheets

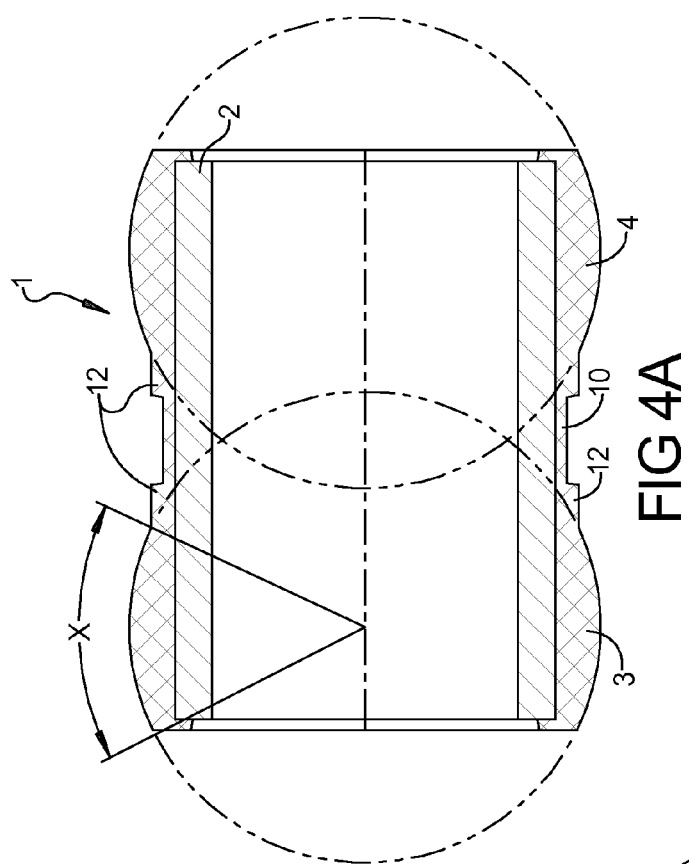
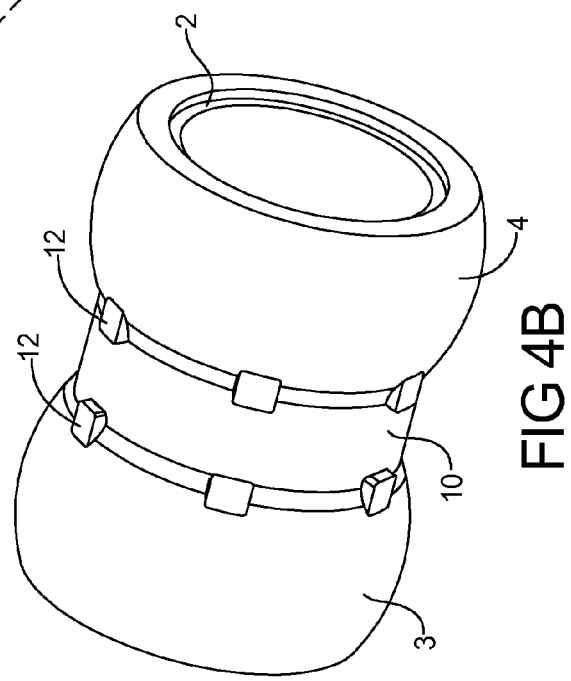

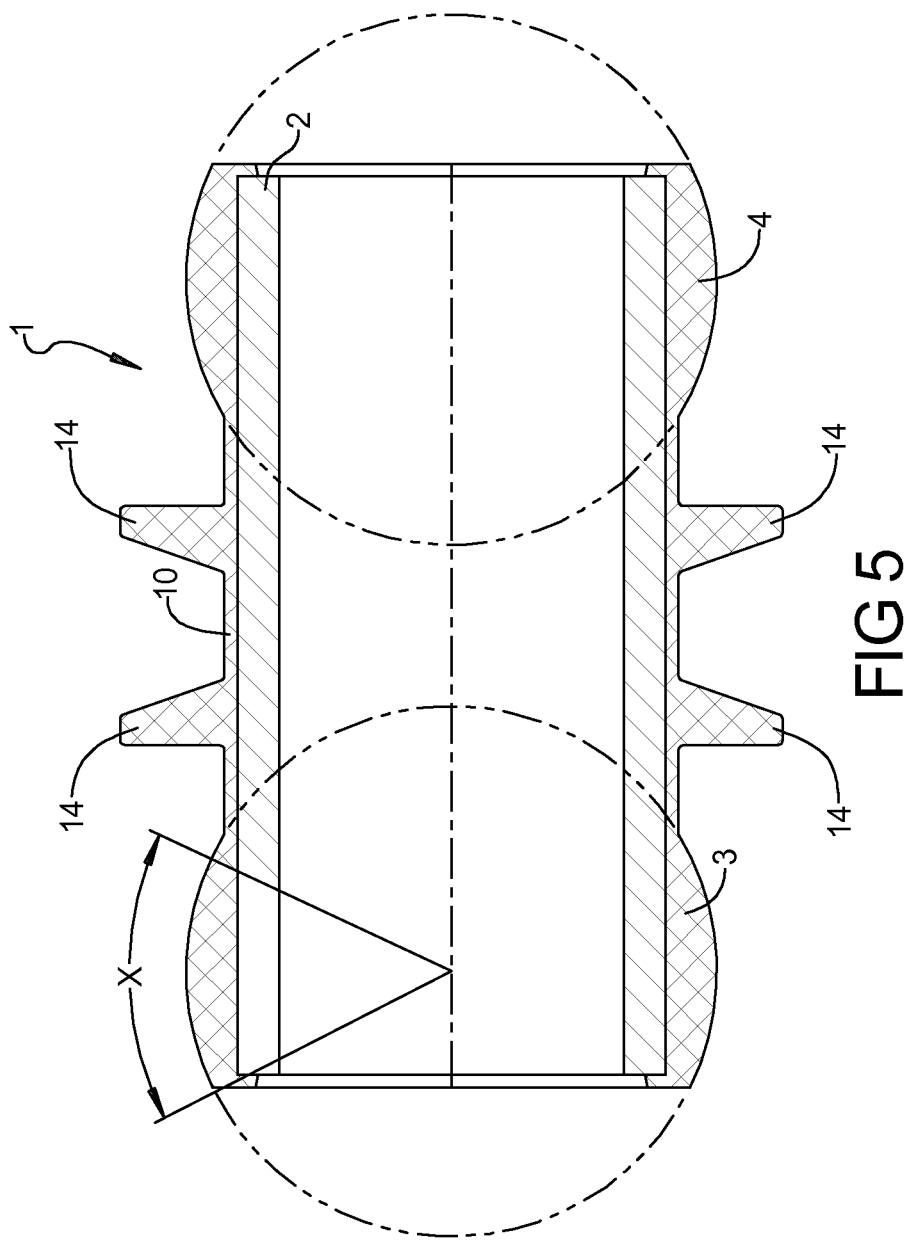

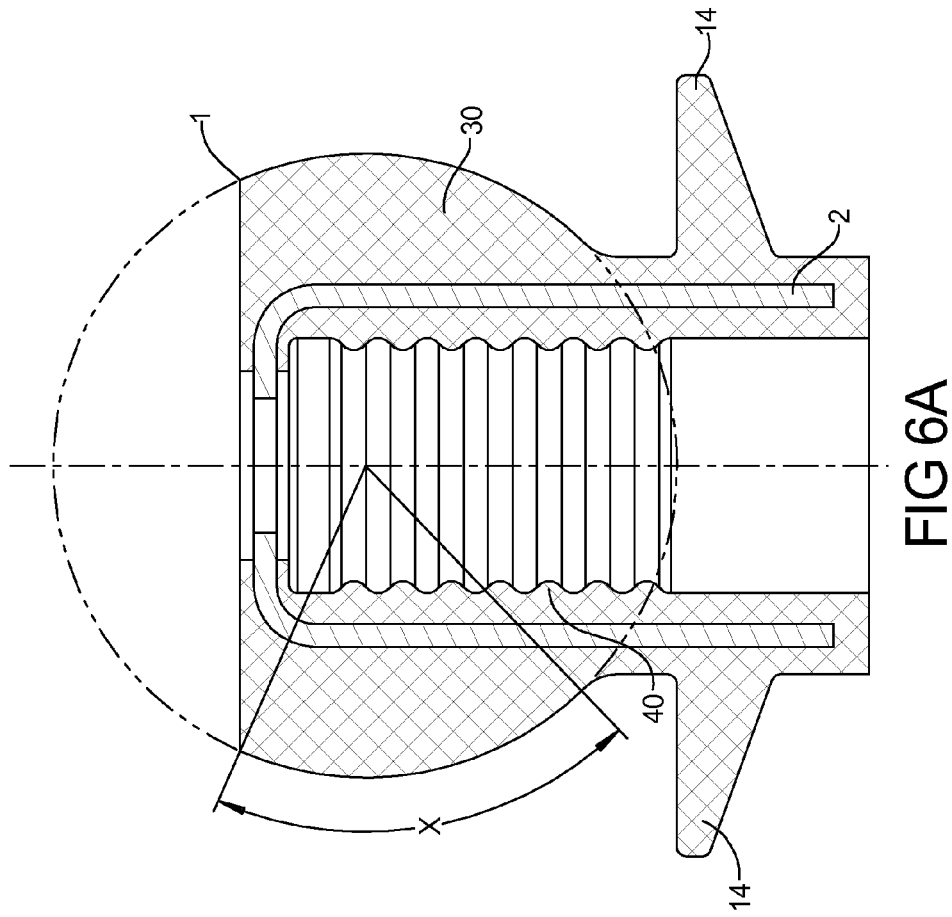
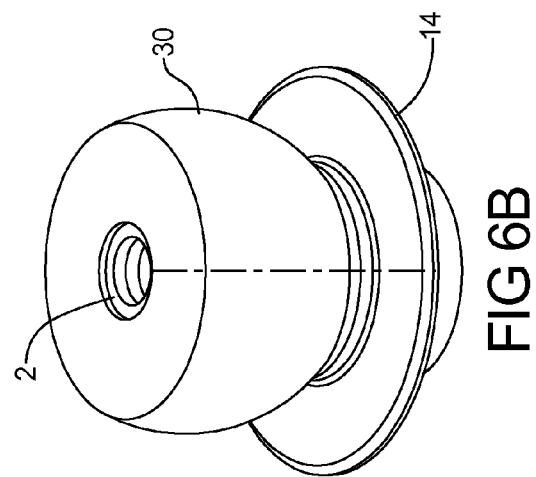

PLUG-IN PIECE

CROSS-REFERENCE TO RELATED APPLICATIONS

This application claims the benefit and priority of German Application No. 10 2012 019 106.5, filed Sep. 28, 2012. The entire disclosure of the above application is incorporated herein by reference.

TECHNICAL FIELD

The present disclosure relates to a plug-in piece for the sealing connection of two mutually assigned cylindrical surfaces, comprising an essentially tubular support body, which on its ends exhibits annularly encircling sealing elements, which are able to engage with the cylindrical surfaces to be sealed for producing a tight connection, wherein at least one of the sealing elements is configured as a sealing bead annularly encircling on the outer surface of the support body, with a spherically curved sealing surface.

BACKGROUND

As a rule, plug-in pieces are used to join two housing parts in medium-sealed fashion, situated adjacent to one another, such as an engine block with adjacent aggregates. As a rule, they include of a tubular or sleeve-shaped support body made of a tough material that is equipped on its bilateral ends on the outer and/or inner circumference with annularly encircling sealing elements made of a rubber-elastic material. For connecting the housing parts, the plug-in pieces with their ends are inserted into corresponding boreholes of the housing parts or placed on corresponding tubular sleeves.

Upon inserting the ends of the sleeve-shaped support body into the particular boreholes of the housing parts or of a tubular sleeve, the sealing elements made of rubber-elastic material adjoin the plug-in piece on the inner walls of the boreholes or the outer wall of pipe sleeve and thus represent a medium-sealed connection between the two housing parts.

An example of a plug-in piece of the generic type is known from DE 195 48 249 A1. On its one end, the known plug-in piece exhibits a spherical sealing bead made of an elastomer. The spherically configured sealing bead also ensures a securely sealing adjoining on the inner surface of the borehole when the longitudinal axes of the boreholes and of the plug-in piece exhibit an angular offset to each other. Additionally, the inner surface of the borehole can roll away, when the connecting elements deflect out, with the seal of the connection ensured to remain tight. Due to the rolling away, there is a substantial reduction in the abrasion of the elastomer in comparison to a slippage or gliding due to the reduced frictional resistance.

What is a drawback with the known plug-in piece is that the circumferential compression of the sealing bead varies depending on the angular setting, due to which, with cardan-mounting, there can be varied erosion of the sealing bead on the curved sealing surface.

SUMMARY

The task of the present disclosure consists in further developing a plug-in piece of the type in question so that the service life and function remains high, independent of the installed situation.

The plug-in piece for sealing connection of two mutually assigned cylindrical surfaces comprises an essentially tubular support body, which on its ends exhibits annularly encircling sealing elements, which can be made to engage to produce a sealing connection with the cylindrical surfaces to be sealed, wherein at least one of the sealing elements is configured as an annularly encircling sealing bead on the outer surface of the support body, with a spherically curved sealing surface. According to the present disclosure, provision is made that the spherical radius of the sealing surface is chosen so that the center of the sphere is roughly at the axis of support body symmetry. It has been shown that in this case the compression forces remain largely constant, independent of the angular setting over the entire surface of the sealing bead.

Preferably the center of the sphere deviates from the axis of support body symmetry by less than 10% of the radius of the sphere, i.e. the length of the exterior diameter of the sealing bead. With deviations greater than 10%, the compression forces can vary when angular settings are extreme. Especially preferred is a deviation of only about 2% of the sphere radius. A deviation of less than 2% is difficult to produce due to the manufacturing tolerance which prevails with usual plug-in piece geometries which allow a mid-point determination in the tool only with an error of up to 0.5% to 1% in the outer diameter.

According to another preferred embodiment form of the present disclosure, the support body on its second end exhibits another encircling sealing bead on the outer circumference of the support body. This support body is suitable for producing a sealing connection of two boreholes situated next to each other.

Preferably such plug-in pieces for connection of hollow bodies or boreholes with the same inner diameter, exhibit a dumbbell shape, with the first and second sealing bead being configured to be mirror images of each other on the two ends.

However, the plug-in piece can also be configured so that on its second end it is suitable for sealing vis-à-vis an outer cylindrical surface such as the outer surface of a tubular hollow body able to be inserted into this end. For this purpose, on the second end of the support body, instead of an exterior encircling sealing element, a second sealing element can be provided that encircles the inner circumference and points radially inwards. Where design spaces are limited, it is advantageous if the first and second sealing element lie on the same axial plane. This has an advantage in that the plug-in piece does not require any additional structural space, since the tubelike hollow bodies can be slid one over the other.

Also with cylindrical surfaces to be connected which have differing inner or outer diameters, the plug-in piece can perform an adapter function by the inner diameter of the support body increasing from the one front end toward the other front end. The transition from smaller to larger diameter can be in stepped fashion or continuous.

A plug-in piece can additionally exhibit dust lips, to prevent dust from penetrating in.

Likewise, centering lips or centering tabs that are known per se can be provided, which additionally center the plug-in piece in the borehole.

To amplify holding in a borehole, retention lips can also be provided, which engage in claw-like fashion in the borehole upon being extracted.

According to another embodiment form of the present disclosure, the support body on its outer and/or inner circumference is at least partially provided with a casing. This protects the support body against mechanical and also chemical loading, which can have an effect from without. In particular, the casing for support bodies made of metal can serve to protect from corrosion, thus allowing secondary rust-protection measures such as applying coatings or the like to be avoided.

Preferably the sealing elements and the casing are configured to be a single piece and make a transition into one another.

According to another preferred embodiment form of the present disclosure, the sealing elements exhibit slanted insertion pieces to even further simplify installation. Also, on the front ends of the support body, the sealing elements can project out somewhat.

Preferably the cylindrical support body consists of an impact-resistant material, and especially preferred is a metallic material. This ensures that the support body, and especially the passageway openings, will have dimensional stability.

The sealing elements and the casing preferably consist of a rubber-elastic material, especially preferred an elastomer or PTFE. In the case of an elastomeric material, the sealing beads and the casing preferably are vulcanized onto the support sheathing. By this means, an absolutely tight connection between the elastomer and the connecting casing is obtained.

In what follows, the plug-in piece is described in greater detail with the aid of the drawings.

DRAWINGS

FIGS. 4A and 4B are a schematic longitudinal cross-section and a perspective 3-D depiction, respectively of the plug-in piece from FIG. 1 with a centering tab;

FIG. 5 is a schematic longitudinal cross-section of the plug-in piece from FIG. 1 with dust lips; and FIGS. 6A and 6B are a schematic longitudinal cross-section and a perspective 3-D depiction, respectively, of the plug-in piece from FIG. 2 with dust lips.

DETAILED DESCRIPTION

Figure 1:
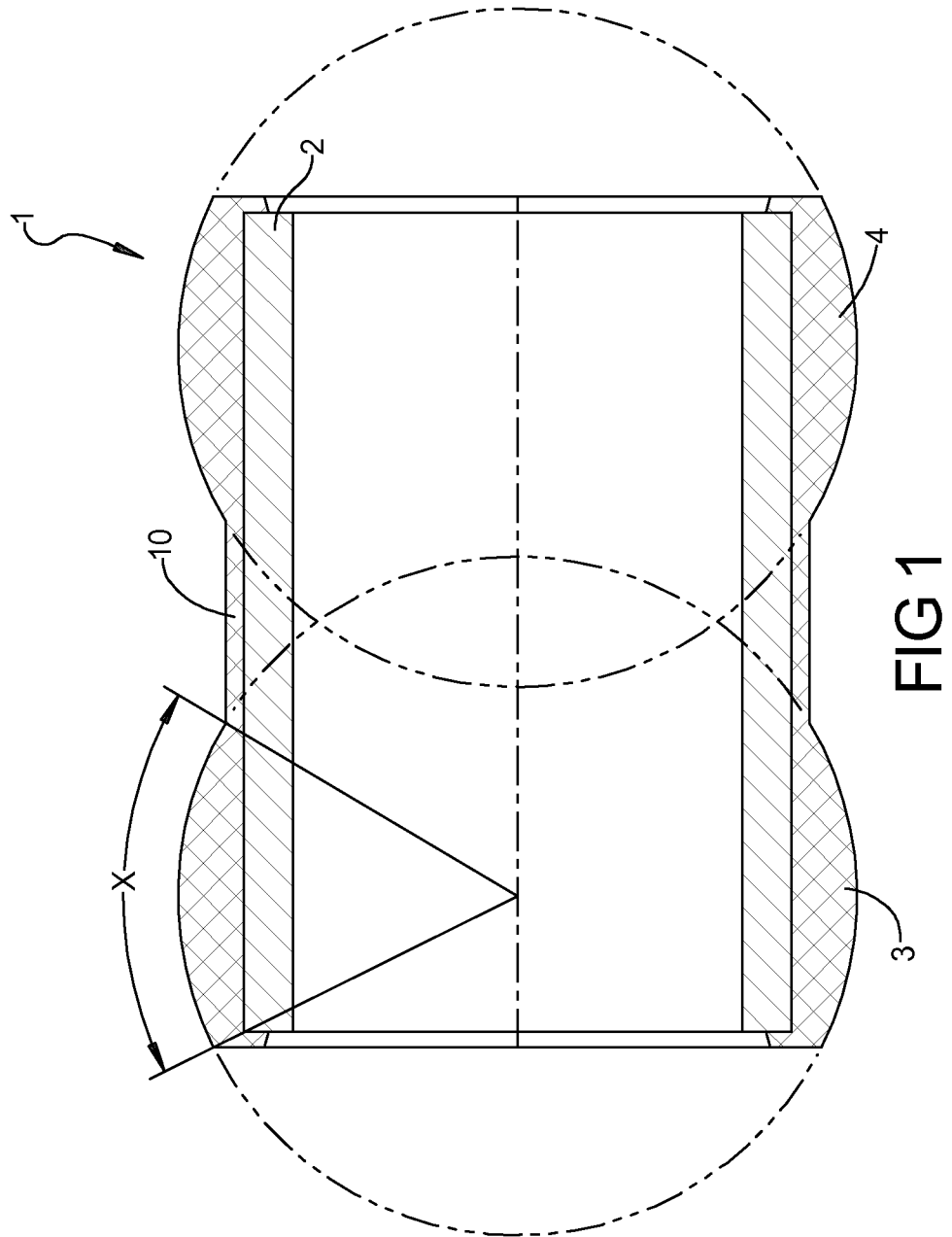
FIG. 1 is a schematic longitudinal cross section of a plug-in piece with spherical-shaped sealing beads on both front sides, configured according to the present disclosure.

One can perceive in FIG. 1 an embodiment example of a plug-in piece 1 with a support body 2, both ends of which on the outer circumference are encircled by sealing beads 3 and 4. The sealing beads 3 and 4 are configured to exhibit specular symmetry to each other; by this means the plug-in piece 1 has the shape of a dumbbell. At both ends, the sealing beads 3 and 4 project outwards somewhat axially.

The sealing beads 3 and 4 are configured as partial spheres, in cross-section. For clarification, the spherical radius is drawn in as a dot-and-dash line. The spherical radius is chosen so that, as one can easily see using the radii drawn in as dashes and dots, the mid-point of the sphere lies roughly on the axis of support body 2 symmetry. By this means, the compression forces are largely constant over the entire surface of the sealing beads 3, 4, independent of the angular setting of the plug-in piece in the design space.

In this figure, as well as in the other figures, the plug-in piece 1 continues to be surrounded on the outer circumference by a casing 10, which, without limiting generality, is configured in one piece and with material unity with the sealing elements 3, 4.

In the longitudinal section, the spherically shaped sealing bead 3, 4 is represented as a circular segment with the center-point angle "X." The size of the center-point angle of the circular segment is to be selected in dependence on the length and outer diameter of the support body so that the plug-in piece can roll away in an installation area over as large an angular range as possible. In the event that a casing is present, a compromise is to be found between as large a curved roll-away surface as possible and still-sufficient wall thickness for the casing. For customary sizes of plug-in pieces (1 mm-100 mm length with a customary ratio of length to exterior diameter of about 1.25), with the dumbbell-shaped configuration of the plug-in piece, center-point angles of smaller than or equal to 70° have proven to be favorable. Especially preferred is a center-point angle between 40° and 55°.

Identical reference symbols in the figures designate identical parts.

Figure 2A:
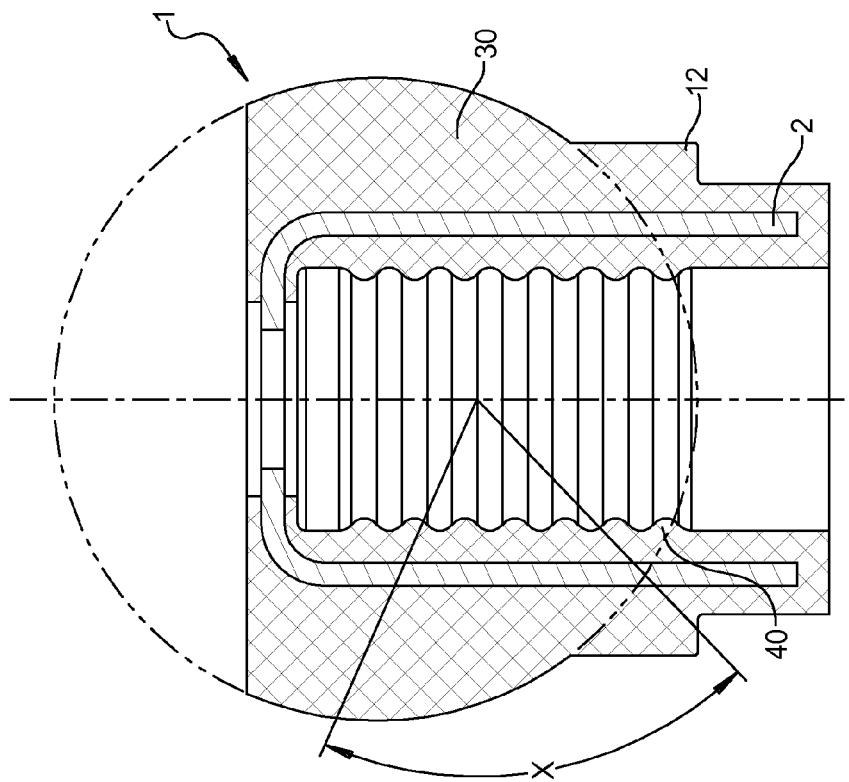
FIGS. 2A and 2B are a schematic longitudinal cross section and a perspective 3-D depiction, respectively, of a plug-in piece with a spherical-shaped sealing bead on one front side and a sealing element pointing inwards on the other front side, both of which lie in one radial plane, configured according to the invention.
Figure 2B:
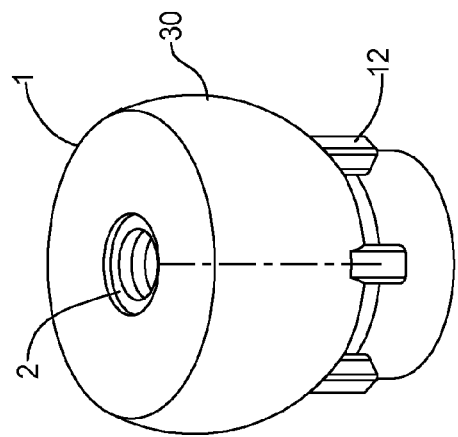

The embodiment example shown in FIGS. 2A and 2B exhibits a spherical sealing bead 30 encircling on the outside only at one end of support body 2. At the other end of support body 2, a second encircling sealing element 40, pointing radially inward is provided. This end of the plug-in piece 1 is suited for sealing vis-à-vis the outer surface of a tubular hollow body able to be inserted into this end. Without limiting the generality, in the embodiment forms depicted, the first 30 and second 40 sealing element lie in the same radial plane. This is advantageous in that the plug-in body 1 as a connecting element requires no additional structural space, since the cylindrical surfaces to be connected, i.e., the tubular hollow bodies, can be slid one over the other. Therefore, the embodiment example depicted is especially suitable for tight design spaces. With this type of a plug-in piece, center-point angles preferably smaller than or equal to 130°, and especially preferred smaller than or equal to 95°, have proven effective.

Figure 3:
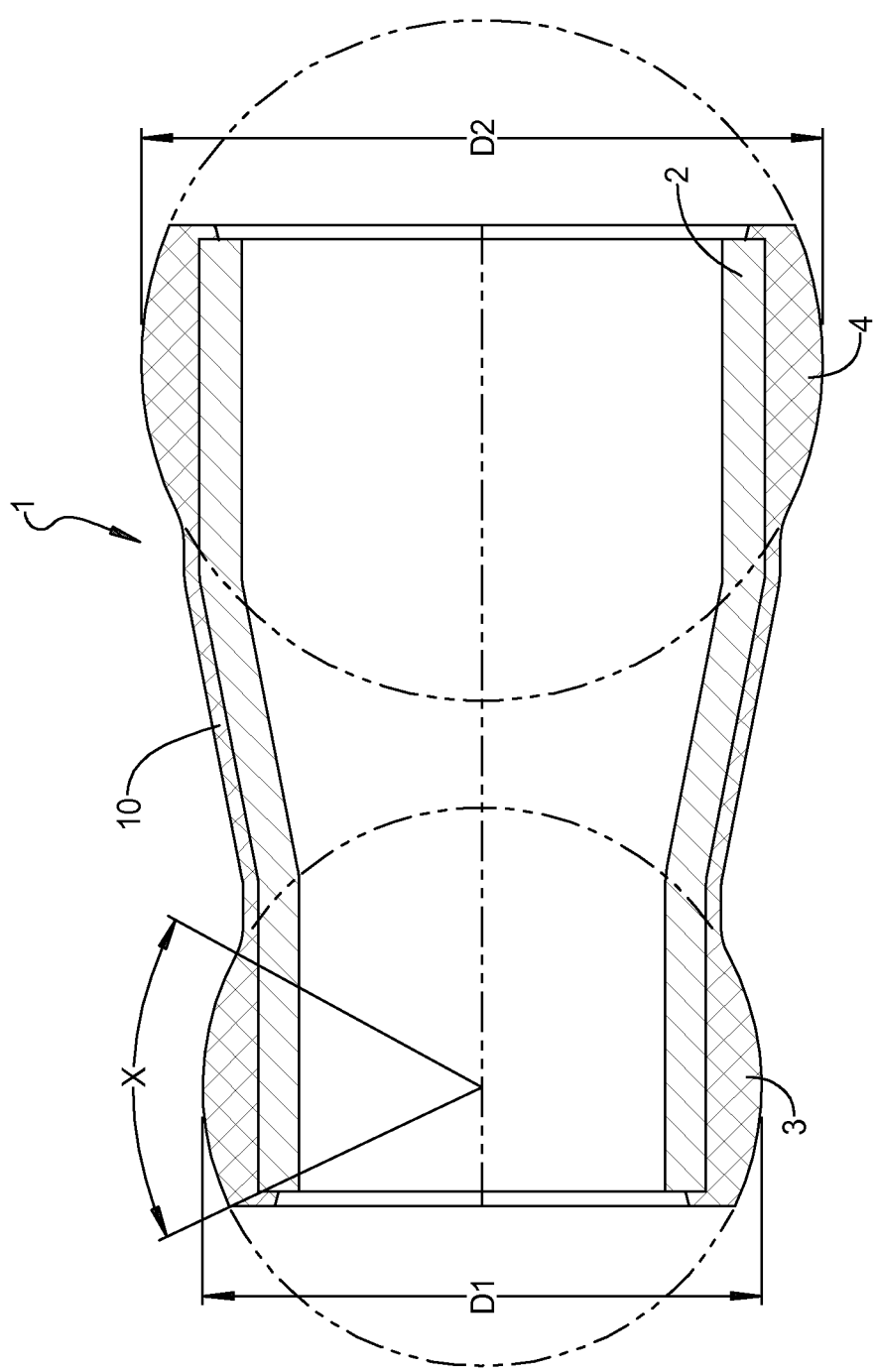
FIG. 3 is a schematic longitudinal cross-section of the plug-in piece from FIG. 1 with an adapter function.

The embodiment example from FIG. 3 is again configured to be dumbbell-shaped with two encircling spherically shaped sealing beads 3, 4, configured according to the invention, on the particular ends of the support body 2. It possesses not merely a connecting function, but also an adaptation function, since the inner diameter of the support body 2 increases conically from the one front end to the other front end. This plug-in piece 1 is suitable for connection of cylindrical surfaces with differing interior diameters (D1, D2 with D1<D2).

The plug-in piece 1 depicted in FIGS. 4A and 4B matches that shown in FIG. 1. However, additionally, on its outer circumference in annularly encircling areas, it exhibits centering tabs 12 placed in distributed fashion. The object of these is to adjoin the cylindrical surfaces to be sealed, to center the plug-in piece upon being installed in the first installation space. By this means, placement into the second installation space is facilitated. Therefore, centering tabs are especially helpful if multiple plug-in pieces are to be mounted simultaneously, or with blind assembly.

The embodiment example from FIG. 5 likewise matches that from FIG. 1. Additionally, it exhibits dust lips 14. The dust lips 14 keep contaminants from outside away from the sealing beads 3, 4.

The embodiment example from FIGS. 6A and 6B matches that shown in FIGS. 2A and 2B, but in addition is provided with dust lip 14.

What is claimed is:

1. A plug-in piece (1) for the sealing connection of two mutually assigned cylindrical surfaces, comprising a substantially tubular support body (2) which, at the ends thereof has annularly encircling sealing elements which can each be brought into engagement with one of the cylindrical surfaces to be sealed in order to produce a tight connection, wherein at least one of the sealing elements is designed as a sealing bead (3, 30) which annularly encircles the outer surface of the support body (2) and has a spherically curved sealing surface, wherein a radius of the sphere of the sealing surface (3, 30) is selected in such a manner that a centre point of the sphere lies approximately on an axis of symmetry of the support body (2), wherein a deviation of the centre point of the sphere from the axis of symmetry is less than 10%.

2. The plug-in piece according to claim 1, wherein a further sealing bead (4) encircling the outer circumference of the support body is provided at a second end of the support body (2).

3. The plug-in piece according to claim 2, wherein the plug-in piece is in the shape of a dumb-bell, wherein the first sealing bead (3) and the second sealing bead (4) are formed in a mirror-inverted manner with respect to each other at the two ends.

4. The plug-in piece according to claim 1, wherein an inside diameter of the support body (2) expands from one end towards the other end.

5. The plug-in piece according to claim 1, wherein a further, radially inwardly pointing second sealing element (40) is provided at the second end of the support body (2).

6. The plug-in piece according to claim 5, wherein the first sealing bead (30) and the inwardly pointing, second sealing element (40) lie in the same axial plane.

7. The plug-in piece according to claim 1, wherein an outer and/or inner circumference of the support body (2) is at least partially provided with a casing (10).

8. The plug-in piece according to claim 7, wherein the sealing elements (3, 4, 30, 40) and the casing (10) are formed as a single part and from a same material.

* * * * *